M. A. BROWN.
AIR BRAKE COUPLING.
APPLICATION FILED APR. 6, 1910.

1,232,204.

Patented July 3, 1917.
3 SHEETS—SHEET 2.

UNITED STATES PATENT OFFICE.

MARK A. BROWN, OF CHATTANOOGA, TENNESSEE, ASSIGNOR, BY MESNE ASSIGNMENTS, TO BROWN-TATE AUTOMATIC CAR CONNECTOR COMPANY, OF SHELBYVILLE, TENNESSEE, A CORPORATION OF TENNESSEE.

AIR-BRAKE COUPLING.

1,232,204.  Specification of Letters Patent.  Patented July 3, 1917.

Application filed April 6, 1910. Serial No. 553,736.

*To all whom it may concern:*

Be it known that I, MARK A. BROWN, a citizen of the United States, residing at Chattanooga, in the county of Hamilton and State of Tennessee, have invented a new and useful Air-Brake Coupling, of which the following is a specification.

The invention relates to improvements in air brake couplings.

The object of the present invention is to improve the construction of air brake couplings, and to provide a simple, inexpensive and efficient air brake coupling, equipped with means for enabling it to be readily suspended from and carried by a car coupling and for permitting the necessary vertical and lateral movement to permit them to yield to the movements of the cars of a train in motion. Another object of the invention is to provide an air brake coupling, capable of coupling and uncoupling automatically on curves as well as straight tracks, and provided with interfitting parts having both rubber and metallic joints, and adapted in coupling to produce a wiping action across the rubber for removing cinders or other accumulation therefrom, whereby an air tight connection is insured. A further object of the invention is to enable the gaskets to be replaced, and similar light repairs to be made without the use of a shifting engine and while the cars are made up in a train.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—

Like numerals of reference designate corresponding parts in all the figures of the drawings.

Figure 1:
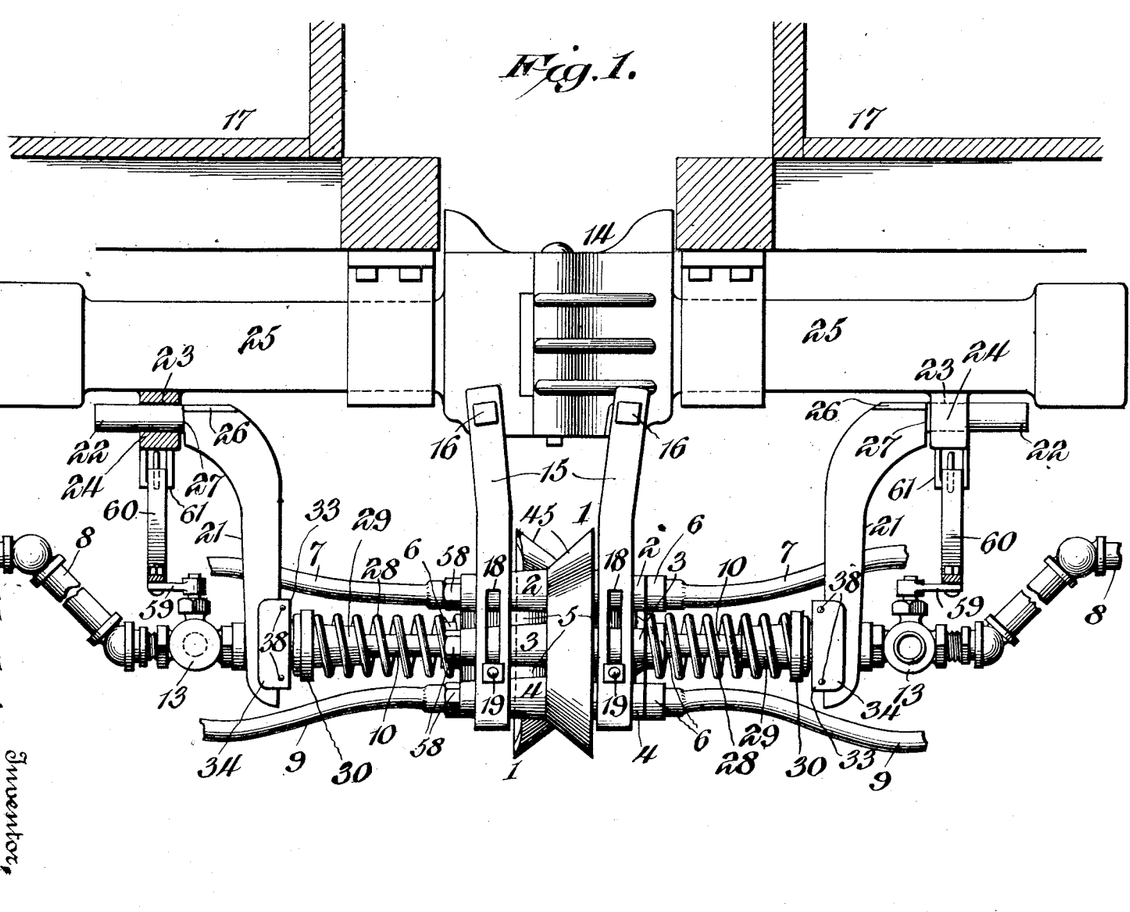
Figure 1 is a side elevation of an air brake coupling, constructed in accordance with this invention, the frames of the cars being in section.
Figure 2:
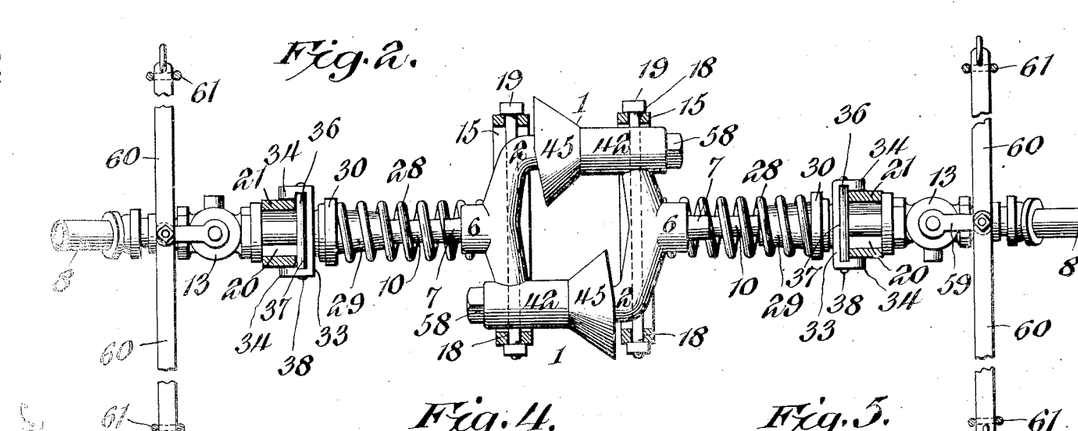
Fig. 2 is a plan view of the same.
Figure 5:
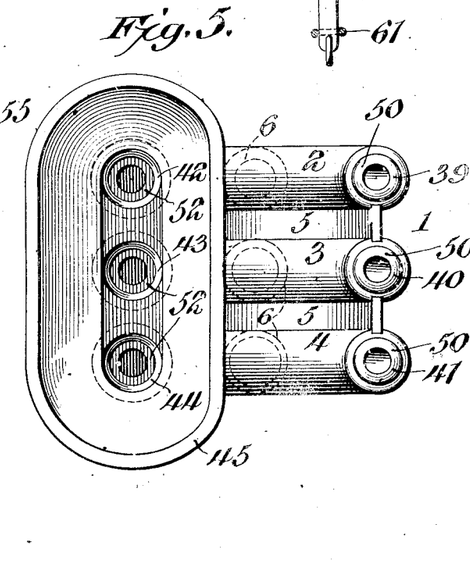
Fig. 5 is a front elevation of one of the coupling heads.

1 designates a coupling head or casting, designed for use on passenger car equipments and consisting of vertically alined upper, intermediate and lower approximately U-shaped pipes or conduits 2, 3 and 4, arranged one above the other and connected together by integral webs 5, as clearly illustrated in Fig. 5 of the drawings. The approximately U-shaped pipes or conduits are composed of spaced sides and a connecting transverse portion, provided with interiorly threaded tubular extensions or nipples 6, to which the signal pipe 7, the train pipe 8 and the steam or head pipe 9 are detachably connected. The intermediate pipe or conduit 3 is connected with the train pipe 8 of the air brake, and the lower pipe or conduit 4 is connected with the steam pipe line 9. The train pipe of the air brake is provided adjacent to the coupling head with a straight pipe section or coupling sleeve 10, constituting a tubular stem and threaded at its outer or front end 11 to engage the interior threads of the nipple of the intermediate or central pipe or conduit 3, and at its rear end 12 for connecting it with a three-way valve 13. The coupling head is suspended from the draw head 14 of a car coupler by means of a front hanger member or carrier iron 15, approximately U-shaped and composed of spaced sides and a connecting bottom portion. The sides have their upper terminals fitted against the sides of the draw head and pivoted to the same by bolts 16, or other suitable fastening devices, permitting the front support or carrier iron to swing longitudinally of the car 17 and holding the carrier iron against lateral movement. The sides or side pieces of the front support or carrier iron are provided with vertical slots 18, through which passes a transverse bolt 19, piercing the coupling head between the intermediate and lower pipes or conduits 3 and 4, and provided at one end with a head and at the opposite end with a nut, as clearly shown in Fig. 2 of the drawings. The slot 18 permits a vertical movement of the coupling head and enables air brake couplings, arranged at different elevations, to be brought into alinement for coupling. The slots 18 also permit the necessary vertical play of the parts incident to the motion of the cars.

The pipe 10 is rigidly connected with the coupling head and forms a stem or shank, and its rear portion is arranged in an opening 20 of a bracket 21, provided at the top with a rearwardly extending horizontally disposed pivot 22, arranged in the bearing opening 23 of a lug 24, preferably formed integral with the shank 25 of the draw head 14, but any other supporting means may be provided for the bracket. The bracket forms a rear support for the air brake coupling, and it has a limited lateral swing and is held against longitudinal swinging movement. The upper end or face 26 of the bracket is beveled or cut-away at each side of the center, as clearly shown in Fig. 8 of the drawings, to space it from the shank 25 of the draw head. This permits the bracket to swing laterally, and the movement is limited by the upper end of the bracket coming in contact with the bottom or lower face of the shank of the draw head. The depending bracket curves downwardly and forwardly from the supporting lug 24, and its rear end face 27 abuts against the same.

The coupling head is yieldably maintained in proper position for coupling by a coiled spring 28, surrounding the pipe or stem 10 and having its outer or forward end fitted on the tubular extension or nipple of the coupling head. The rear or inner end of the coiled spring 28 is arranged on a tapering sleeve 29, having an enlarged portion or flange 30 at its rear end and provided in the same with a socket 31, receiving a rounded tubular projecting portion 32 of a slidable plate or member 33. The slidable plate or member 33 is fitted against the front or outer face of the rear bracket 21, and it is provided with side flanges 34 to embrace the lower portion of the bracket. The pipe section or stem 10 extends through a central opening 35 of the slidable plate or member 33. The central opening 35 tapers forwardly, its front or outer end being slightly larger than the exterior diameter of the pipe section or stem 10, and its rear end being enlarged to permit a ball and socket action of the sleeve 29 and the slidable plate or member 33. This will enable the coupling head to yield to the vibratory movements of the cars when in motion. The slidable plate or member, which is adapted to move vertically on the rear bracket, is equipped with antifriction devices, preferably consisting of transversely disposed rollers 36, arranged in horizontal transverse grooves 37 and mounted on pivots or spindles 38, piercing the plate or member at opposite sides thereof and headed to retain them in place. The transverse rollers are arranged at the upper and lower portions of the slidable plate or member and reduce the wear of the parts to a minimum.

The side portions of the approximately U-shaped pipes or conduits at one side of the coupling head are tapered and extended beyond the connecting webs 5 to form upper, intermediate and lower tubular extensions or nozzles 39, 40 and 41, and the side portions of the pipes or conduits 2, 3 and 4 at the opposite side of the coupling head form upper, intermediate and lower horizontal openings or sockets 42, 43 and 44 to receive the tubular extensions or nozzles 39, 40 and 41, provided on a complementary coupling of the adjoining car. The coupling head is equipped with a vertically disposed oblong shell 45, forming a flaring mouth or entrance for guiding the tubular extensions or nozzles of one car into the sockets of the coupling head of the adjoining car.

Each of the longitudinal openings or sockets of the coupling head is counterbored to receive a metallic thimble or sleeve 46 and to provide a front shoulder 47 to form a stop for limiting the inward or forward movement of the thimble or sleeve. The sleeve or thimble is provided with a passage 48, extending laterally from one side of the sleeve or thimble and communicating with the adjacent end of the transverse portion of the pipe or conduit. The front end 49 of the passage is enlarged and tapered to provide a socket to receive the coacting tubular extension or nozzle of the adjoining coupling head. The end 50 of the tubular extension or nozzle is rounded and the inner or rear end of the socket is correspondingly rounded to form a ground metallic joint. The sleeve or thimble is provided in the wall of its socket 49 with an annular groove 51 for the reception of a gasket 52 of rubber or other suitable material, which extends beyond the plane of the metallic walls of the socket 49, and is adapted to be compressed by the co-acting tapering tubular extension or nozzle, whereby an air tight joint is effected. The gasket is provided with a groove 53 to receive the front wall or flange 54, formed by grooving the sleeve or thimble. The inner or rear wall 53ª of the groove 54ª of the sleeve or thimble 46 is undercut or beveled and extends inwardly or rearwardly, and the inner or rear edge of the gasket is provided with a substantially V-shaped groove 55ª having oppositely inclined walls, the outer wall fitting the beveled or undercut rear wall 53ª of the groove 54ª and interlocking the inner edge of the gasket with the sleeve or thimble. The inner inwardly beveled or undercut wall of the groove 55ª of the gasket projects from the inner face of the sleeve or thimble, as clearly illustrated in Fig. 10 of the drawings, and any leakage of air past the end of the nozzle will operate to expand such projecting inner wall of the groove 55ª against the exterior of the nozzle and form an air tight connection. The front flange or wall 54 terminates short of the annular wall of the opening or socket of the coupling head to permit a portion of the elastic gasket to fit against the shoulder 47, and it is also adapted to engage the gasket for enabling the same to be removed with the sleeve or thimble. When the tapering tubular extension or nozzle enters the socket of the sleeve or thimble, it moves across the bearing face of the elastic gasket and wipes the same, and is adapted to remove from the gasket cinders or other accumulations. This insures a clean air tight joint and prevents dust, cinders and the like from producing a leakage in the coupling. The coiled springs of the air brake coupling are compressed when the cars are coupled, and they maintain the nozzles in the sockets of the coupling head firmly in the sockets of the adjoining coupling head, and as the tubular extensions or nozzles fit tightly within the co-acting coupling head, the two coupling heads are maintained firmly in engagement with each other so that there is no liability of them becoming accidentally disconnected through the vertical vibration and lateral movement of the cars.

The sleeve or thimble has a solid rear wall and is provided in its rear end with a recess 55, having undercut walls adapted to permit a suitable tool to engage with the sleeve or thimble, should it become necessary to use force in removing the same from the coupling head. The sleeve or thimble is detachably held in place by a screw plug 56, threaded to engage interior threads 57 of the coupling head and provided with a projecting polygonal portion 58, adapted to be engaged by a wrench, or other tool for removing the screw plug. The detachable plug and the sleeve or thimble afford ready access to the gasket, should it become necessary to renew the latter, and such slight repairs may be made without the use of a shifting engine and while the cars are made up in a train and coupled together.

The three-way valve 13 is provided for the purpose of enabling an ordinary coupling hose to be connected with the train pipe in order to afford means for connecting the latter with a car not equipped with the improved air brake coupling. The three-way valve, which is of the ordinary construction, is provided with an arm 59, which is loosely connected with the inner ends of a pair of transversely disposed operating bars 60, extending to the opposite sides of the car and supported at their outer ends in a suitable hanger 61. The operating bars are adapted to enable the valve to be manipulated without necessitating the train hand going between the cars. In practice the signal pipe 7 and the steam pipe 9 will be equipped with similarly arranged valves and operating means, illustration of which has been omitted for convenience, as they are identically the same in structure as the valve 13 and the operating mechanism thereof.

Figures 3, 6, 7, 8, 9, 10:
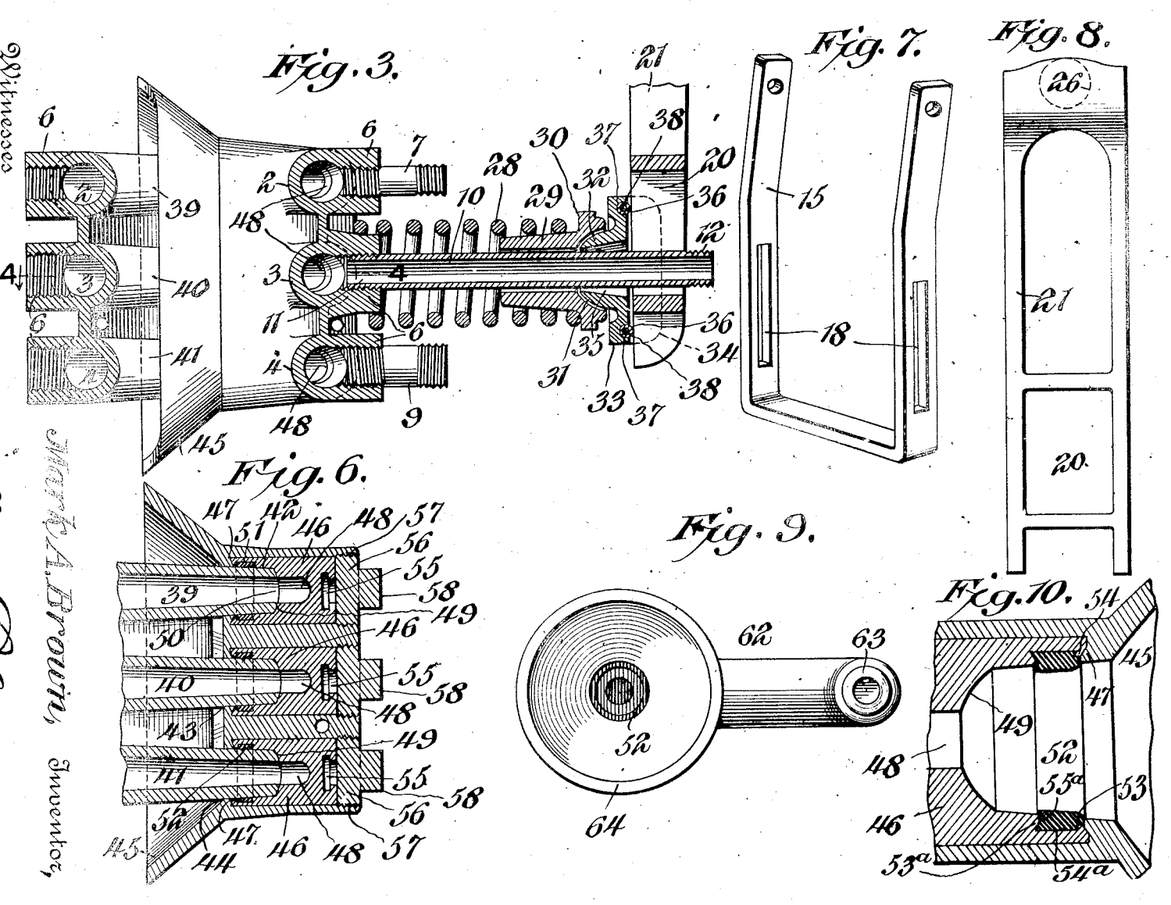
Fig. 3 is an enlarged central longitudinal view of the air brake coupling.
Fig. 6 is a vertical sectional view on the line 6—6 of Fig. 4.
Fig. 7 is a detail perspective view of the pivotally mounted front support or carrier iron.
Fig. 8 is an elevation of the rear bracket.
Fig. 9 is a front elevation of a coupling head, illustrating the construction for freight car equipments.
Fig. 10 is an enlarged detail sectional view of a portion of one of the sockets of the coupling head, illustrating the manner of mounting the elastic gaskets.
Figure 4:
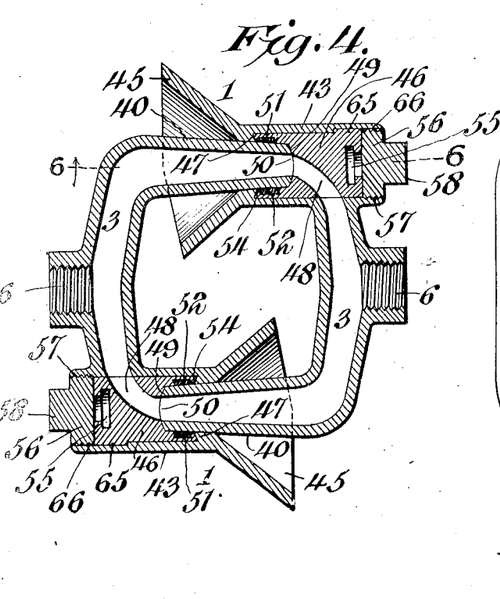
Fig. 4 is a horizontal sectional view, taken substantially on the line 4—4 of Fig. 3.

In Fig. 9 of the drawings is illustrated a coupling head 62, consisting of a single pipe or conduit and provided at one side with a nozzle 63, and having a circular shell 64 at the opposite side. The coupling head shown in Fig. 9 is designed for use on freight cars and similar equipments, having only a single pipe line.

In order to prevent the gasket carrying sleeve or thimble from rotating and maintaining the air passage in proper register with the passage or opening of the transverse portion of the pipe or conduit, it is provided at its outer side with a key or rib 65, fitting in a suitable groove or recess 66 of the coupling head and interlocking the sleeve or thimble therewith.

Having thus fully described my invention, what I claim as new and desire to secure by Letters Patent, is:—

1. An air brake coupling including coupling heads, each provided at one side with a projecting nozzle and having a longitudinal opening at the opposite side, the nozzle of each coupling head fitting in the opening of the other, removable sleeves arranged within the openings of the coupling heads and receiving the nozzles, and elastic gaskets held in the openings of the coupling heads by the sleeves and surrounding and engaging the nozzles within the said openings, said gaskets being carried by the sleeves in inserting the latter in and removing them from the coupling heads, and the said sleeves being arranged to be detached without disconnecting the coupling heads.

2. An air brake coupling including coupling heads, each provided at one side with a longitudinally projecting nozzle and having a longitudinal opening at the opposite side, the nozzle of each coupling head fitting in the opening of the other and having a rounded end, sleeves removably mounted within the openings of the coupling heads, each sleeve being provided with a socket having a curved wall to be engaged by the rounded end of the nozzle of a companion coupling head and form a ground metallic joint, and gaskets carried by the sleeves, each gasket being spaced from the curved wall of the socket and arranged to surround and engage said nozzle in advance of the said ground joint, said gaskets being adapted to be withdrawn from around the nozzles and removed from the coupling heads along with the sleeves without disconnecting the coupling heads.

3. An air brake coupling including coupling heads, each provided at one side with a longitudinally projecting nozzle and having a longitudinal opening at the opposite side, the nozzle of each coupling head fitting in the opening of the other, removable sleeves arranged within the openings of the coupling heads and receiving the nozzles, interior shoulders provided at an intermediate point of the openings of the coupling heads and forming interior stops for the sleeves, gaskets mounted at the open ends of the sleeves, means for retaining the sleeves in the openings of the coupling heads with the inner ends of the sleeves and said gaskets bearing against said shoulders, said means holding the sleeves and the gaskets firmly within the coupling heads without compressing the gaskets, said gaskets being carried by the sleeves in inserting the latter in and removing them from the coupling heads, and the said sleeves being arranged to be detached without disconnecting the coupling heads.

4. An air brake coupling including coupling heads, each provided at one side with a projecting nozzle and having an opening at the opposite side, the nozzle of each coupling head extending into the opening of the other, removable sleeves held within the openings and provided with interior annular grooves, and gaskets mounted in the grooves of the sleeves and carried by and removable with the same, said gaskets being held in a relatively fixed position with respect to the coupling heads, and the sleeves being arranged to be removed with the gaskets without disconnecting the coupling heads.

5. An air brake coupling including a coupling head provided at one side with a nozzle and having an opening at the opposite side, a sleeve removably arranged in the opening and provided with a passage extending through one side of the sleeve, the latter being provided with a solid inner end wall and having a recess in its rear end to enable a tool to be engaged with it, and a gasket held in the opening of the coupling head by the sleeve.

6. An air brake coupling including coupling heads, each provided at one side with a projecting nozzle and having a longitudinal opening at the opposite side, the nozzle of each coupling head fitting in the opening of the other, removable sleeves arranged within the openings of the coupling heads and receiving the nozzles, gaskets provided on the inside of the sleeves at the open ends thereof, and arranged to surround and engage said nozzles, means for interlocking the sleeves with the coupling heads so as to hold said sleeves from rotary movement, and means for retaining the sleeves in the openings of the coupling heads and holding the same from further inward movement, said means being adapted to retain the sleeves within the coupling heads without compressing the gaskets, and said gaskets being capable of removal with the sleeves from the coupling heads without disconnecting the latter.

7. An air brake coupling including a coupling head, a front carrier iron receiving the coupling head and provided with means for pivotally connecting its sides to a car coupler and arranged to swing longitudinally, and a rear bracket having a longitudinal pivot and arranged to swing laterally.

8. An air brake coupling including a coupling head, an approximately U-shaped front support or carrier iron provided at the upper ends of the sides with means for pivotally connecting it to a car coupler and arranged to swing longitudinally, and a pivotally mounted rear bracket arranged to swing laterally.

9. An air brake coupling including an approximately U-shaped front support having means for pivotally connecting it to a car coupler and provided at opposite sides with vertical slots, a coupling head arranged in the support and provided with means for engaging the said slots, and a pivotally mounted rear bracket arranged to swing laterally.

10. An air brake coupling including a coupling head, pivotally mounted front supporting means for the coupling head arranged to swing longitudinally and held against lateral movement, and rear supporting means for the coupling head arranged to swing transversely and held against longitudinal swinging movement, and a cushioning spring for the coupling head interposed between the same and the rear supporting means.

11. An air brake coupling including a coupling head, pivotally mounted front supporting means for the coupling head arranged to swing longitudinally and held against lateral movement, and rear supporting means for the coupling head arranged to swing transversely and held against longitudinal swinging movement, and a cushioning spring for the coupling head having one end connected with the rear supporting means and held against longitudinal movement by the same.

12. In an air brake coupling, the combination with a car coupling having a shank or draw bar provided with a bearing lug, of an air brake coupling head, a front support for the coupling head carried by the car coupling, and an integral projecting rear bracket having a horizontal pivot mounted in the bearing lug, said bracket being arranged to swing laterally and having its movement limited by the said shank.

13. In an air brake coupling, the combination with a draw head having a shank provided at the bottom with a depending bearing lug, of a coupling head, and supporting means including a front longitudinally swinging carrier iron pivotally connected to the draw head and depending therefrom, and a rear laterally swinging bracket provided with a pivot mounted in the bearing lug.

14. An air brake coupling including a coupling head, a pivoted longitudinally swinging front support, a rear laterally swinging bracket, and a coiled spring interposed between the bracket and the coupling head for urging the coupling head and the front support forwardly.

15. An air brake coupling including a coupling head, a tubular member extending therefrom, a rear support, a coiled spring surrounding the tubular member for urging the coupling head forwardly or outwardly, a sleeve extending into the inner end of the spring and having a socket, and a co-acting member interposed between the sleeve and the support and having an enlarged opening to permit free movement of the tubular member and provided with a head fitting the socket of the sleeve.

16. An air brake coupling including a coupling head, a tubular member extending therefrom, a support, a coiled spring surrounding the tubular member for urging the coupling head forwardly or outwardly, a sleeve arranged on the tubular member and receiving the inner end of the coiled spring and provided with a socket, and a co-acting member fitting in the socket and movable upwardly and downwardly on the support.

17. An air brake coupling including a coupling head, a tubular member extending therefrom, a support, a coiled spring surrounding the tubular member for urging the coupling head forwardly or outwardly, a sleeve arranged on the tubular member and extending into the inner end of the coiled spring and provided with a socket, and a co-acting member interposed between the sleeve and the support and having a head fitting in the socket, said co-acting member being provided with a tubular opening to receive the tubular support of the coupling head.

18. An air brake coupling including a coupling head, a tubular member extending therefrom, a support, a coiled spring surrounding the tubular member for urging the coupling head forwardly or outwardly, a sleeve arranged on the tubular member and receiving the inner end of the coiled spring and provided with a socket, and a vertically movable plate having a head fitting in the socket of the sleeve, said plate being provided with side flanges to embrace the support.

19. An air brake coupling including a coupling head, a tubular member extending therefrom, a support, a coiled spring surrounding the tubular member for urging the coupling head forwardly or outwardly, a sleeve arranged on the tubular member and receiving the inner end of the coiled spring and provided with a socket, a vertically movable plate having a head fitting in the socket of the sleeve, said plate being provided with side flanges to embrace the support and having transverse grooves, and anti-friction devices mounted in the grooves and bearing against the support.

20. An air brake coupling including coupling heads, each provided at one side with a projecting nozzle and having a longitudinal opening at the other side, the nozzle of each coupling head fitting in the opening of the other, sleeves arranged in the said openings and receiving the projecting nozzles, and provided with lateral openings, annular gaskets arranged within and carried by the sleeves in introducing the latter into and removing the same from the coupling heads, said sleeves being arranged to be removed without disconnecting the coupling heads, and means for retaining the sleeves in the openings of the coupling heads, said means being adapted to hold the sleeve firmly in the coupling head without compressing the gasket.

21. An air brake coupling including a coupler head, a front carrier iron supporting the coupler head and provided with means for pivotally connecting its sides to a car coupler and arranged to swing longitudinally and held against lateral movement, and a rear supporting bracket having a horizontal pivot and arranged to swing laterally and held against longitudinal swinging movement.

22. A train pipe coupling comprising a pair of hanger members pivotally mounted upon the respective members of the car coupler and provided in their side pieces with longitudinal slots, castings having portions extending through the slots of the hanger members and provided with a plurality of vertically alined longitudinal passages, supporting brackets having a limited sidewise play mounted beneath the respective members of the car coupler, coupling sleeves extending into the central passages of the castings and through the lower ends of the supporting brackets, flexible means of connection between the said coupling sleeves and the brake pipe, coiled springs around the coupling sleeves to hold the latter pressed together, and flexible means of connection between the upper and lower passages of the castings and the signal and heating pipes of the train.

23. A train pipe coupling comprising a pair of hanger members pivotally mounted upon the respective members of the car coupler, castings supported by the said hanger members, means of slidable engagement between the hangers and castings, whereby the latter are capable of limited vertical play, supporting brackets mounted beneath the respective members of the car coupler, coupling sleeves extended into the castings and through the lower ends of the supporting brackets, flexible means of connection between the said sleeves and the brake pipes, coiled springs around the coupling sleeves to hold the castings in yieldable engagement, and flexible means of connection between the upper and lower passages of the castings and the signal and heating pipes of the train.

24. In a train pipe coupling, bearing plates having longitudinal bearings mounted beneath the respective members of the car coupler, supporting brackets having vertical portions provided at their upper ends with rounded bearing portions arranged in the longitudinal bearings of the bearing plates, said brackets being capable of a limited side play, castings provided with vertically alined longitudinal passages mounted between the respective members of the car coupler, coupling sleeves extending into the central passages of the castings and through the supporting brackets, flexible means of connection between said sleeves and the brake pipe of the train, and other flexible means of connection between the upper and lower longitudinal passages of the castings and the signal and heating pipes of the train.

25. An air brake coupling including coupling heads, each provided at one side with a projecting nozzle and having a longitudinal opening at the opposite side, the nozzle of each coupling head fitting in the opening of the other, removable sleeves arranged within the openings of the coupling heads and provided with interior sockets to receive the ends of the nozzles, said sockets having an interior wall forming an abutment for the ends of the nozzles, said sleeves having lateral openings beyond said wall communicating with the interior of the nozzles, interiorly arranged gaskets carried by the open ends of the sleeves, said gaskets being adapted to surround and engage said nozzles in advance of the terminals of the latter, and said gaskets being capable of removal with the sleeves from the coupling heads without disconnecting the latter.

26. An air brake coupling including coupling heads, each provided at one side with a projecting nozzle and having a longitudinal opening at the opposite side, the nozzle of each coupling head fitting in the opening of the other, removable sleeves arranged within the openings of the coupling heads and provided with an interior socket receiving the ends of the nozzles, means for interlocking the sleeves within said openings so as to hold the same from rotary movement, abutments for the open ends of the sleeves to prevent further inward movement, interiorly arranged gaskets carried by the sleeves at the open end thereof and surrounding the nozzle, and means engaging with the other ends of the sleeves for retaining the same within the openings of the coupling heads, said means being adapted to hold the sleeves in place without compressing the gaskets, the latter being removable with the sleeves without disconnecting the coupling heads.

27. An air brake coupling including a coupling head having a rearwardly extending tubular member designed to be connected with a train pipe, a bracket in which the rear or inner portion of the tubular member is mounted for vertical sliding movement upwardly and downwardly on the bracket, and a longitudinal sliding movement through the bracket, means for mounting said bracket to allow for a lateral swinging movement thereof, a spring disposed on the tubular member for urging the coupling head forwardly or outwardly, a bearing receiving the tubular member and interposed between the spring and the bracket, and hanging means connected with the coupling head and adapted to support the same in an extended position for coupling and capable of oscillation to permit the air brake coupling to yield to the movements of a train without separating.

28. An air brake coupling including a supporting bracket, a coupling head having a rearwardly extending tubular member, a ball and socket bearing mounted on the bracket and receiving the tubular member of the coupling head and permitting the same to slide through the bracket and to oscillate thereon, said ball and socket bearing being slidable vertically on the bracket and movable hanging means connected with the coupling head in advance of the bracket.

29. An air brake coupling including a coupling head having a rearwardly extending tubular member designed to be connected with a train pipe, a rear support in which the rear or inner portion of the tubular member is mounted for vertical sliding movement upwardly and downwardly on the support and a longitudinal sliding movement through said support, a spring disposed on the tubular member for urging the coupling head forwardly or outwardly, a ball and socket bearing receiving the tubular member and interposed between the spring and the bracket, said bearing participating in the up and down movements of the tubular member, and hanging means connected with the coupling head and adapted to support the same in an extended position for coupling and capable of oscillation to permit the air brake coupling to yield to the movements of a train without separating.

30. An air brake coupling including a coupling head having a rearwardly extending tubular member designed to be connected with a train pipe, a slotted bracket in which the rear or inner portion of the tubular member is mounted for vertical sliding movement upwardly and downwardly of the bracket and a longitudinal sliding movement through the bracket, a spring disposed on the tubular member for urging the coupling head forwardly or outwardly, a bearing loosely receiving the tubular member and interposed between the spring and the bracket, said bearing being movable vertically upon the outer face of the bracket and the tubular member sliding up and down in the slot of said bracket, and hanging means connected with the coupling head and adapted to support the same in an extended position for coupling and capable of oscillation to permit the air brake coupling to yield to the movements of a train without separating.

31. An air brake coupling including a coupling head having a rearwardly extending tubular member designed to be connected with a train pipe, supporting means in which the rear or inner portion of the tubular member is mounted for vertical sliding movement upwardly and downwardly thereon, a bearing receiving the rear or inner portion of the tubular member and movable vertically on the supporting means, a spring disposed on the tubular member for urging the coupling head forwardly or outwardly, said spring engaging with said bearing and permitting a longitudinal sliding movement of the tubular member, and hanging means connected with the coupling head to permit a vertical and a longitudinal movement of said coupling head, the rear supporting means providing for a lateral movement of the coupling.

32. An air brake coupling including a coupling head, a tubular stem extending therefrom, a rear support, a coiled spring surrounding the tubular stem for urging the coupling head forwardly or outwardly, a sleeve extending into the inner end of the spring, and a coacting member interposed between the sleeve and the support and having an opening to permit free movement of the tubular stem, said sleeve and coacting member forming a bearing, one of the parts being provided with a socket and the other having a head fitted in the socket.

33. An air brake coupling including a coupling head, a tubular stem extending therefrom, a support, a coiled spring surrounding the tubular member for urging the coupling head forwardly or outwardly, a sleeve arranged on the tubular stem and receiving the inner end of the coiled spring, and a coacting member arranged on the stem and interposed between the sleeve and the support and movable upwardly and downwardly on the latter.

34. An air brake coupling including a coupling head, a tubular stem extending therefrom, a support, a coiled spring surrounding the tubular stem for urging the coupling head forwardly or outwardly, a sleeve arranged on the stem at the inner end of the spring, and a coacting member having an opening for the tubular stem and interposed between the sleeve and the support and movable upwardly and downwardly on the latter, said sleeve and member being fitted against each other and one of the parts being provided with a socket receiving the other part and forming a bearing.

35. An air brake coupling including a coupling head, a tubular stem extending therefrom, a support, a coiled spring surrounding the tubular stem for urging the coupling head forwardly or outwardly, a sleeve arranged on the tubular stem at the inner end of the coiled spring, and a vertically movable plate having side flanges embracing the support, said plate being interposed between the support and the sleeve and coacting with the latter to form a bearing to permit free oscillatory movement of the coupling head and the stem.

36. An air brake coupling including a coupling head, a tubular stem extending therefrom, a support, a coiled spring surrounding the tubular stem for urging the coupling head forwardly or outwardly, a sleeve disposed on the tubular stem at the inner end of the spring, a vertically movable bearing plate having an opening to receive the stem and fitting against and coacting with the sleeve to form a bearing, said plate being slidable upwardly and downwardly on the support, and antifriction devices interposed between the plate and the support.

37. An air brake coupling including coupling heads, each provided at one side with a projecting nozzle and having an opening at the opposite side, the nozzle of each coupling head fitting in the opening of the other coupling head, sleeves removably mounted in the openings of the coupling heads and receiving the projecting nozzles, said sleeves being provided with interior annular grooves having under-cut walls, an elastic gasket fitted in the said grooves and interlocked with the sleeves by the said undercut walls, and surrounding the said nozzles, said gaskets being carried by the sleeves and the latter being arranged to be removed from the coupling heads without disconnecting the same.

38. An air brake coupling including a coupling head provided at one side with a projecting nozzle and having an opening at the opposite side, a sleeve removably mounted within the opening in position to receive the projecting nozzle of a companion coupling head, and an annular gasket carried by the sleeve in introducing the same into and removing the sleeve from the coupling head, said gasket being provided at the inner or rear edge with an annular undercut portion projecting from the inner face of the sleeve and adapted to engage with the said projecting nozzle of the companion coupling head.

39. An air brake coupling including coupling heads, each provided at one side with a projecting nozzle and having an opening at the opposite side, the nozzle of each coupling head extending into the opening of the other coupling head, and annular gaskets arranged within the openings and surrounding and embracing the projecting nozzles, said gaskets being provided with annular under-cut projecting portions engaging the said nozzles.

In testimony that I claim the foregoing as my own, I have hereto affixed my signature in the presence of two witnesses.

MARK A. BROWN.

Witnesses:
 JOHN H. SIGGERS,
 PENDLETON HOOVER.